United States Patent [19]
Eing

[11] Patent Number: 5,122,764
[45] Date of Patent: Jun. 16, 1992

[54] CIRCUIT FOR EXCITING A RESONATOR

[76] Inventor: Hubert Eing, Stadtlohner Strasse 71, D-4423, Gescher, Fed. Rep. of Germany

[21] Appl. No.: 728,715

[22] Filed: Jul. 11, 1991

[30] Foreign Application Priority Data

Jul. 12, 1990 [DE] Fed. Rep. of Germany ... 9010530[U]

[51] Int. Cl.⁵ .............................. H03B 5/00
[52] U.S. Cl. ................... 331/154; 331/156; 331/173
[58] Field of Search .......... 331/57, 65, 116 M, 116 R, 331/116 FE, 153, 154, 156, 172, 173, 174

[56] References Cited

U.S. PATENT DOCUMENTS 4,879,528  11/1989  Gotanda ........................ 331/65 X Primary Examiner—David Mis
Attorney, Agent, or Firm—Foley & Lardner

[57] ABSTRACT

To excite a resonator so that it oscillates at its resonant frequency, a self-oscillating system is used having a digital delay element (such as a digital memory) or an analog delay element (such as a bucket-brigade device) inserted in a feed-back loop. Detecting the oscillation signal and exciting the resonator is done periodically and alternately. Thus, the oscillation signal is detected while the resonator oscillates freely. In the embodiment disclosed, a coil (1) serves both to detect the oscillation signal and to excite the resonator which is in the form of a string (2). A switch (3) is controlled so as to apply the detected signal to a delay circuit (7) during each first period and to supply the delayed signal as an exciting signal to the coil (1) during each second period.

6 Claims, 1 Drawing Sheet

CIRCUIT FOR EXCITING A RESONATOR

BACKGROUND OF THE INVENTION

The present invention relates to a circuit for exciting a resonator to oscillate at its resonant frequency. The resonator may be an electrical or a mechanical resonator.

For exactly determining the resonant frequency of a resonator, a circuit is commonly required which disturbs the oscillating system as little as possible. Disturbances result in a shift of the resonant frequency, thereby causing errors in measurement.

It is common to excite an oscillating system, such as a string, by pulse sequences of variable frequency and subsequently detect the resonant frequency of the system (string) while it oscillates freely. The frequency of the pulse sequence must be adjusted to a value which is as close as possible to the resonant frequency of the system. To this end, adjustment is made so that the amplitude of the resonant oscillation becomes maximum.

Conventional methods based on this principle are too slow for many applications. They are, in general, suitable only for static systems where the resonant frequency does not vary over substantial periods of time.

SUMMARY OF THE INVENTION

It is an object of the present invention to provide a circuit for exciting a resonator to oscillate at its resonant frequency, which circuit is inexpensive and permits fast and exact detection of the resonant frequency. It is a further object to provide such a circuit which is adapted for use with resonators having a dynamically varying resonant frequency.

To meet this object, the invention provides a circuit for exciting a resonator to oscillate at its resonant frequency, which comprises detector means for detecting an output signal responsive to the oscillation frequency of the resonator, delay means for delaying the output signal, exciting means for generating an excitation signal from the delayed output signal, and switching means periodically operable between alternate states for applying the output signal to the delay means and preventing the excitation signal from being supplied to the resonator during a first period, and for applying the excitation signal to the resonator during a second period.

The delay means included in the feed-back loop of the circuit according to the invention may be a digital delay element, e.g. including a digital memory, or an analog delay element, e.g. including a bucket-brigade device. Since such a self-oscillating system automatically oscillates at its resonant frequency, no adjustment is required. The fact that the detected output signal is delayed provides a convenient means for time-separating the signal detection and the excitation, with the resonator being able to oscillate freely while the output signal is being detected. This makes it possible to excite the resonator precisely at its resonant frequency. The delay means included in the feedback loop may be adjustable. The circuit according to the invention may also be used for the remote control of a distant resonator.

In a preferred embodiment, the detected output signal is an a.c. voltage having a frequency corresponding to the oscillation frequency of the resonator. As a result, the detected output signal, upon being delayed and amplified, may be used as the excitation signal without further processing. As a further alternative, the frequency of the a.c. voltage may be a multiple or a fraction of the resonator frequency. Depending on the delay element employed, it may be further advantageous to derive a d.c. signal or even a digital signal which may be temporarily stored and re-converted into an a.c. excitation signal.

In another preferred embodiment, the first period in which the resonator output signal is detected, is longer than a second period in which the excitation signal is applied to the resonator. This is an inexpensive way to ensure that only that time-portion of the detected output signal is used for exciting the resonator, which is unaffected by such disturbances as are particularly likely to occur at the start of the detecting period due to the circuit being switched-over from excitation to detection.

In a further preferred embodiment of the invention, the delay means includes means for adjusting the delay time so as to adapt the phase of the excitation signal to that of the resonator oscillation. Such a fine adjustment can be performed automatically or manually.

To start the operation of the circuit, a noise signal may be used to initiate the oscillation of the resonator. Such a noise signal covers a wide frequency band including the resonant frequency and is thus suited to initiate the excitation.

In a further embodiment, the circuit of the invention includes means for measuring the frequency of the resonator output signal.

DETAILED DESCRIPTION OF A PREFERRED EMBODIMENT

Figure 1:
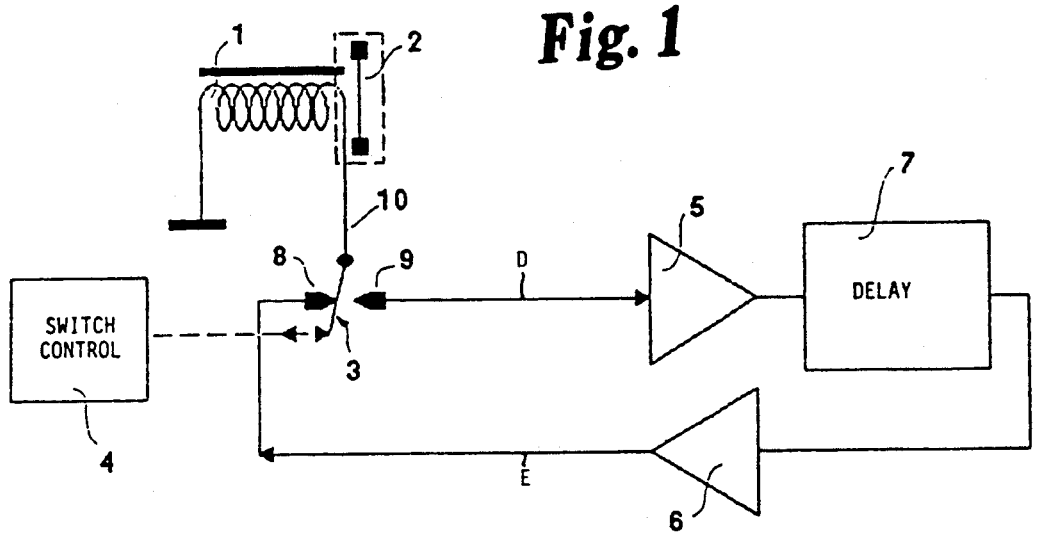
FIG. 1 is a schematic diagram of a circuit for exciting a string to oscillate at its resonant frequency.

In the circuit illustrated in FIG. 1, the magnetic field of a coil 1 excites a string 2 of magnetic material to oscillate. One terminal 10 of the coil 1 is connected to the movable center contact of a change-over switch 3. In the switching condition shown in FIG. 1, the movable contact engages the fixed contact 8 connected to a driver amplifier 6. The switch 3 is shown as a mechanical switch. In an alternative embodiment, the switch 3 may be realized by a contact-less transistor switch.

The coil 1 also serves to detect the oscillation of the resonator string 2. This end, a control circuit 4, throws the movable contact of the switch 3 over to the fixed contact 9 which is connected to the input of a detector amplifier 5. The a.c. signal induced in the coil 1 by the oscillating string 2 is thus amplified by the amplifier 5 and applied to a delay element 7. The output of the delay element 7 is connected to the input of the driver amplifier 6.

For efficient operation, a good inductive coupling is desired between the coil 1 and the oscillating string 2. To increase the induction of an a.c. signal in the detector operation of the coil 1, a magnet may be disposed in the vicinity of the coil 1.

Figure 2:
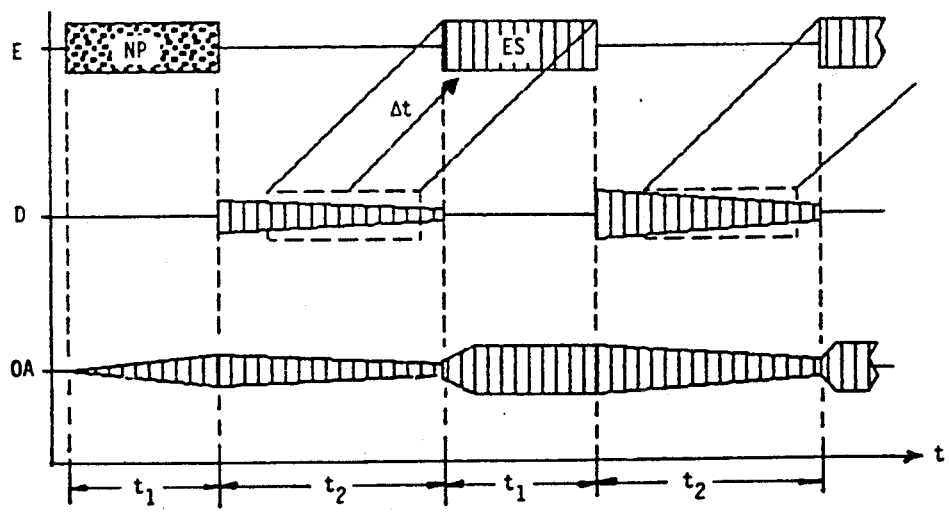
FIG. 2 is a time chart useful in explaining the operation of the circuit according to FIG. 1.

The operation of the circuit shown in FIG. 1 will now be explained by reference to the time chart of FIG. 2, in which the resonator output signal D occurring at the input of the detector amplifier 5, the excitation signal E occurring at the output of the driver amplifier 6, and the oscillation amplitude OA of the string 2 are depicted over the time axis t.

The periods in which the coil 1 is connected to the contact 8 and functions to excite the oscillation of the string 2 are designated $t_1$, and the periods in which the coil 1 is connected to the contact 9 and functions to detect the oscillation of the string 2 are designated $t_2$. In FIG. 2, the hatched signal portions are preferably sinusoidal a.c. voltages. Alternatively, and dependent on the properties of the amplifiers 5 and 6 and of the delay elements 7, the exciting signal E may include sequences of pulses, such as square pulses.

When the circuit starts operating, the string 2 will not oscillate, and the resonator output signal D will essentially consist of a noise signal. This noise is passed through the detector amplifier 5, the delay element 7 and the driver amplifier 6, and is applied as a noise package NP during a switching period $t_1$, in which the coil terminal 10 is connected to the fixed contact 8 of the switch 3, to the coil 1 which in this condition functions to excite the string 2. The noise package NP includes a wide range of frequencies and will therefore cause slight oscillations 11 of the string 2 at its resonant frequency.

During the subsequent switching period $t_2$, the decaying oscillation 12 of the string 2 induces in the coil 1, which then functions as a detector, the resonator output signal D. A portion of this signal (marked by the dotted box in FIG. 2) is amplified by the detecting amplifier 5, delayed in the delay element 7 by the delay time $\Delta t$ and is, in the subsequent switching period $t_1$, applied back to the coil 1 as an excitation signal ES. The signal ES is at the resonant frequency of the string 2 and will therefore intensify the oscillation of the string 2.

The same process is repeated in the subsequent switching periods $t_1$ and $t_2$ during which the string 2 will reach its maximum oscillation amplitude.

As should be apparent from the above description, the circuit is self-adaptive in that its oscillation frequency will dynamically follow any variations in the resonant frequency of the resonator (string 2).

In order precisely to detect the resonance frequency of the resonator, the output signal must be derived from the freely oscillating resonator during an interval, in which the disturbing influences of the excitation are no longer effective, but before the oscillation has not yet excessively decayed. In the preferred embodiment described above, there is no overlap between the periods $t_1$ (excitation) and $t_2$ (detection). Further, the period $t_2$ is made longer than $t_1$, and the delay time $\Delta t$ is adjusted so that the portion of the resonator output signal D detected immediately upon change-over of the switch 3 is suppressed and not used to excite the coil 1. A delay time $\Delta t \approx (t_1 + t_2)/2$ will meet this object.

It is advantageous to adjust the phase of the excitation signal E to that of the oscillating resonator to achieve maximum excitation efficiency. Such a tuning can be done by a fine adjustment of the delay time $\Delta t$ to a value at which the amplitude of the resonator output signal D becomes maximum.

The embodiment described above may be used not only for exciting a string but is also useful in connection with other mechanical or electrical resonators, such as an inductively coupled oscillating circuit.

What is claimed is:

1. A circuit for exciting a resonator to oscillate at its resonant frequency, comprising
   detector means for detecting an output signal responsive to the oscillation frequency of said resonator,
   delay means for delaying said output signal,
   exciting means for generating an excitation signal from the delayed output signal, and
   switching means periodically operable between alternate states for applying said output signal to said delay means and preventing said excitation signal from being supplied to said resonator during a first period, and for applying said excitation signal to said resonator during a second period.

2. The circuit of claim 1 wherein said output signal is an a.c. voltage having a frequency corresponding to the oscillation frequency of said resonator.

3. The circuit of claim 1, wherein said first period is longer than said second period.

4. The circuit of claim 1, wherein said delay means includes means for adjusting the delay time so as to adjust the phase of said excitation signal to the phase of the resonator oscillation.

5. The circuit of claim 1 and including means for generating a noise signal as said excitation signal to initiate the oscillation of said resonator.

6. The circuit of claim 1 and including means for measuring the frequency of said output signal.

* * * * *